US010625794B1

(12) United States Patent
Grajek et al.

(10) Patent No.: US 10,625,794 B1
(45) Date of Patent: Apr. 21, 2020

(54) ASSEMBLY OF MATING SUBASSEMBLIES HAVING DIMENSIONAL CONTROL FEATURES FOR A MOTOR VEHICLE

(71) Applicant: Global IP Holdings, LLC, Sterling Heights, MI (US)

(72) Inventors: Scott Allen Grajek, Washington Township, MI (US); Jesse Brian Straight, Dacula, GA (US); Dustin Martin Fowler, Dacula, GA (US); Shane Caird Morse, Grosse Pointe Farms, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 16/167,706

(22) Filed: Oct. 23, 2018

(51) Int. Cl.
- *B62D 35/00* (2006.01)
- *B62D 27/00* (2006.01)
- *B60R 13/02* (2006.01)
- *B29C 70/18* (2006.01)
- *B29C 43/52* (2006.01)
- *B29K 105/08* (2006.01)

(52) U.S. Cl.
CPC ............ *B62D 35/007* (2013.01); *B29C 43/52* (2013.01); *B29C 70/18* (2013.01); *B60R 13/0237* (2013.01); *B62D 27/00* (2013.01); *B29K 2105/0809* (2013.01); *B60R 2013/0293* (2013.01)

(58) Field of Classification Search
CPC ............................. B62D 35/00; B62D 35/0007

USPC ............................................ 296/180.1, 180.5
See application file for complete search history.

(56) References Cited

U.S. PATENT DOCUMENTS

| | | | |
|---|---|---|---|
| 5,106,147 | A | 4/1992 | Okada et al. |
| 5,356,195 | A | 10/1994 | Kanda |
| 6,007,143 | A | 12/1999 | Lehmann et al. |
| 7,220,032 | B2 | 5/2007 | Mori |
| 7,264,300 | B2 | 9/2007 | Hillgaertner |
| 7,686,386 | B2 | 3/2010 | Marks et al. |
| 8,113,571 | B2 | 2/2012 | Goenueldinc |
| 8,251,435 | B2 * | 8/2012 | Ezaka ..................... B29C 65/06 296/180.1 |
| 8,652,611 | B2 | 2/2014 | Gaudig et al. |
| 9,180,631 | B2 | 11/2015 | Fisher, Jr. et al. |
| 2005/0255311 | A1 | 11/2005 | Formella |
| 2009/0008961 | A1 | 1/2009 | Thomas et al. |
| 2009/0284042 | A1* | 11/2009 | Jungert ................ B62D 35/007 296/180.1 |
| 2016/0152287 | A1 | 6/2016 | Fuchs et al. |
| 2016/0303954 | A1 | 10/2016 | Kawashima et al. |
| 2017/0073021 | A1 | 3/2017 | Roddy et al. |
| 2018/0085991 | A1 | 3/2018 | Kia et al. |

(Continued)

*Primary Examiner* — Dennis H Pedder
(74) *Attorney, Agent, or Firm* — Brooks Kushman P.C.

(57) ABSTRACT

An assembly of mating subassemblies having dimensional control features for a motor vehicle is provided. The assembly includes a composite molded first subassembly having a first set of molded-in dimensional control features. The assembly also includes an injection molded second subassembly having a second set of molded-in dimensional control features. The first and second sets of dimensional control features are integrally formed on their respective subassemblies to permit contact between the first and second sets of control features when the subassemblies are assembled together.

8 Claims, 15 Drawing Sheets

(56) References Cited

U.S. PATENT DOCUMENTS

2018/0099704 A1  4/2018  Weiss
2018/0105100 A1  4/2018  Erb et al.

* cited by examiner

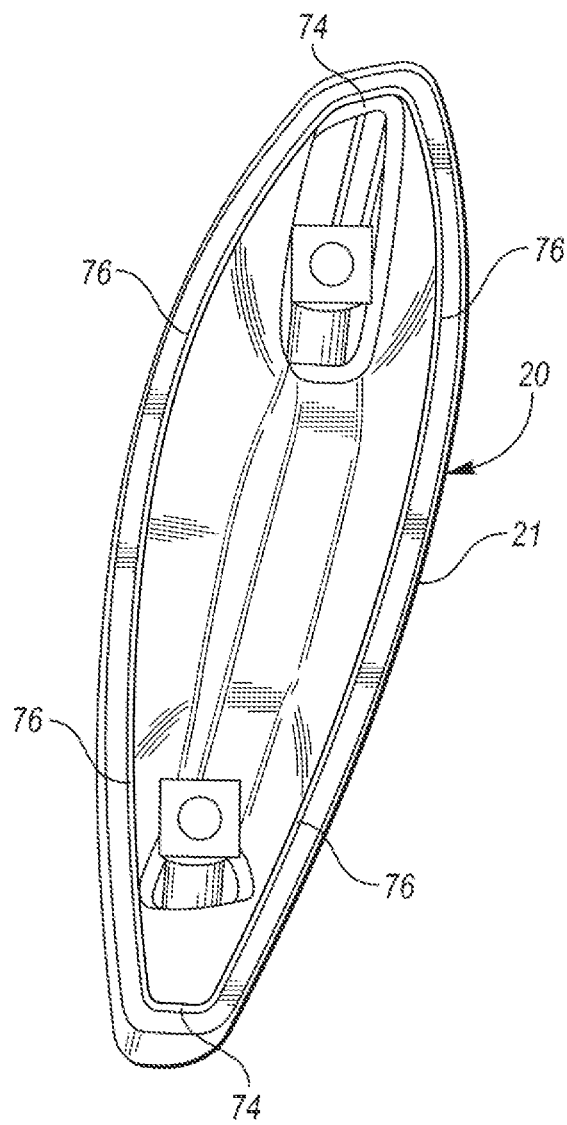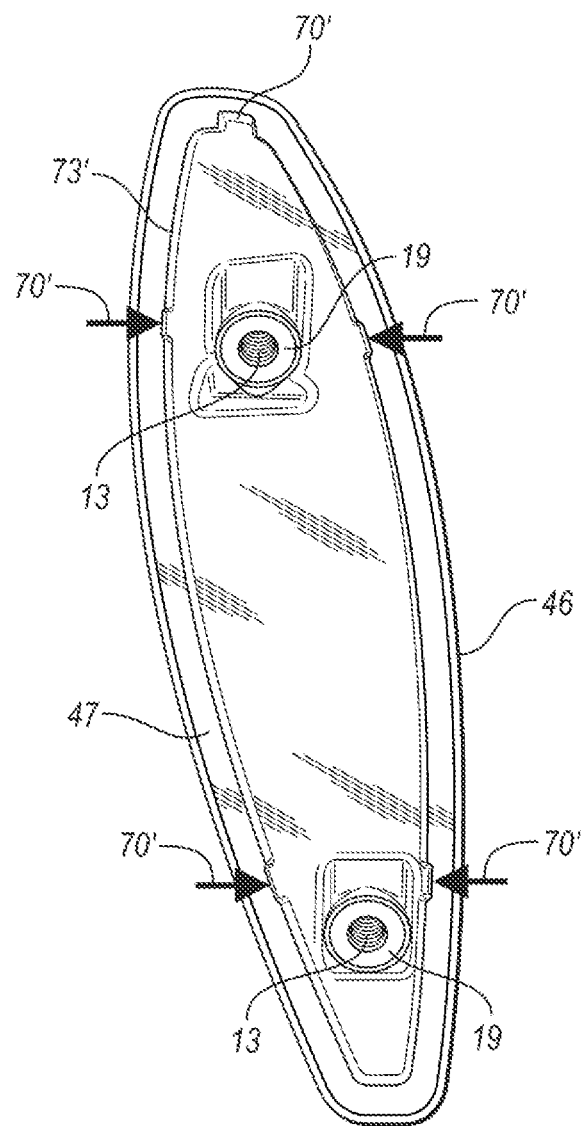
FIG. 16
FIG. 17

ASSEMBLY OF MATING SUBASSEMBLIES HAVING DIMENSIONAL CONTROL FEATURES FOR A MOTOR VEHICLE

TECHNICAL FIELD

At least one embodiment of the present invention generally relates to assemblies of mating subassemblies for motor vehicles and, in particular, to such assemblies and subassemblies which have dimensional control features.

OVERVIEW

Composite materials are typically made from two or more constituent materials with significantly different physical or chemical properties. Typically, the constituent materials include a matrix (or bond) material, such as resin (e.g., thermoset epoxy), and a reinforcement material, such as a plurality of fibers (e.g., woven layer of carbon fibers). When combined, the constituent materials typically produce a composite material with characteristics different from the individual constituent materials even though the constituent materials generally remain separate and distinct within the finished structure of the composite material. Carbon-fiber reinforced polymer (CFRP) is an example of such a composite material.

One method of producing CFRP parts or panels is by layering sheets of carbon fiber cloth or fabric into a mold in the shape of the final product. The alignment and weave of the cloth fibers is chosen to optimize the strength and stiffness properties of the resulting material. The mold is then filled with epoxy and is heated or air-cured. The resulting part is very corrosion-resistant, stiff, and strong for its weight. Parts used in less critical areas are manufactured by draping cloth over a mold, with epoxy either preimpregnated into the fibers (also known as pre-preg) or "painted" over it. High-performance parts using single molds are often vacuum-bagged and/or autoclave-cured, because even small air bubbles in the material will reduce strength. An alternative to the autoclave method is to use internal pressure via inflatable air bladders or EPS foam inside the non-cured laid-up carbon fiber.

Composite materials may be preferred for many reasons. For example, composite materials may be stronger and/or lighter than traditional materials. As a result, composite materials are generally used to construct various objects such as vehicles (e.g., airplanes, automobiles, boats, bicycles, and/or components thereof), and non-vehicle structures (e.g., buildings, bridges, swimming pool panels, shower stalls, bathtubs, storage tanks, and/or components thereof).

U.S. Patent documents 2005/0255311 and 2018/0085991 disclose a wide variety of motor vehicle parts made of carbon fiber composites including spoilers.

Air flow directors of various types are well-known for vehicles such as automobiles and trucks. Such devices include front and rear body-mounted airfoils like inverted wings, rear and roof mounted spoilers or air dams, and bottom-mounted skirts. Such aerodynamics shapers and ground effects equipment have become popular on racing vehicles for increasing road contact at high speeds and for imparting greater stability. Their appeal has spread to sports car enthusiasts in the general public, so that airfoils, spoilers and skirts are now utilized for aesthetic and cosmetic purposes on many road vehicles, even in the absence of any aerodynamic requirement.

The following U.S. patent documents show a wide variety of automotive spoilers: U.S. Pat. Nos. 5,106,147; 5,356,195; 6,007,143; 7,264,300; 7,220,032; 8,113,571; 2009/0008961; 2016/0152287; 2016/0303954; 2017/0073021; 2018/0099704; and 2018/0105100.

One problem associated with the prior art is that when composite materials are to be bonded together to form an assembly of composite materials a very tight molding tolerance is required and, consequently, more complex tooling and post-molding operations for surface preparations are needed.

For example, structural assemblies made of fiber-reinforced composite materials and having complex geometries require additional processes for joining such fiber-reinforced composite materials. For this purpose, it is customary to bond cured structural parts to one another by joining using a bonding agent. For this purpose, the surfaces of cured structural parts are treated, if appropriate, for example ground and/or cleaned. Then, an adhesion promoter is applied under certain circumstances, to the treated surfaces. This was followed by the application of an adhesive, with which the structural parts to be bonded to one another are then fixed. It is not just the case that this process necessitates relatively laborious handling of the structural parts; in addition, the pretreatment of the structural parts and also the joining process itself have to be carried out very precisely because here faults repeatedly lead to weakening of the structured parts.

As described in U.S. Pat. No. 7,686,386, automotive manufacturers strive for assembly processes and computer designs that enable repeatable and reliable positioning of vehicle components. The ability to achieve desired assembly configurations enhances consumer perception of quality. Additionally, aesthetic qualities often require minimization of positioning error. For example, the final assembled position of a body trim member depends in part upon its positioning on the body component to which it is to be attached. Even when locating features are provided on the body component to aid in proper positioning of the trim member, the final position may be impacted by variability in the body component. For example, when the body component itself is formed or assembled from several components, such as multiple layers of sheet metal, the dimensional tolerance "stack-up" of these many components leads to variability in the position of the locating features.

As referred to herein, a "fore-aft position" (ie. F/A) refers to the position of a component along the length of a vehicle (i.e., between the front bumper to the rear bumper). A "fore-aft-locating feature" is a structural feature of a first component that a second component is located on to establish the fore-aft position of the second component. The second component may have a "fore-aft-positioning feature" which is a structural feature of the second component that may be positioned on i.e., put into contact with, the fore-aft-locating feature of the first component to establish the fore-aft position of the second component.

As referred to herein, a "cross-car position" (ie. C/C) refers to the position of a vehicle component laterally, from the drive side to the passenger side of a vehicle. Thus, a "cross-car-locating feature" is a structural feature of a first component that a second component is located on to establish the cross-car position of the second component. The second component may have a "cross-car-positioning feature" which is a structural feature of the second component that may be positioned on, i.e., put into contact with, the cross-car-locating feature of the first component to establish the cross-car position of the second component.

Thin-wall injection molding (TWIM) is conventionally defined as molding parts that have a nominal wall thickness of 1 mm or less and a surface area of at least 50 cm2. Thin wall is relative, however. It also can be named "thin wall" as the flow length/thickness ratio is above 100 or 150. TWIM has been paid more and more attention, due to economic and environmental concerns. The reason is that thin-wall molded parts could be made lighter, more compact, less expensive, and quicker because of fast cooling. New environmental regulations require less plastic to be used at the source or in the initial stage of manufacturing. Thus, TWIM is a viable option for reducing the weight and size of plastic components.

U.S. Pat. No. 8,652,611 discloses a carrier for a motor vehicle, with at least one low-load region for accommodating relatively low loads, which is formed using thin-wall technology, and at least one high-load region for accommodating relatively high loads, which is formed using plastic foam technology and connected to at least one low-load region. The low load region has relatively low strength due to the wall thickness.

As described in U.S. Pat. No. 9,180,631, inserts may be used in the assembly of composite and metal structures or parts for various transport vehicles, such as aircraft, spacecraft, rotorcraft, watercraft, automobiles, trucks, buses, or other transport vehicles. Such inserts may be used to receive mating fasteners, provide attachment points for multi-part assemblies, and provide load transfer points. Examples of such inserts may include press-fit inserts, swaged inserts, molded-in inserts, threaded inserts, or other suitable inserts or fittings.

Methods for installing inserts into composite and metal structures or parts may include, for example, mold in place methods, such as where molded-in inserts are installed during molding, or for example, more expensive post-molding methods, such as where press-fit inserts or swaged inserts are installed after molding.

Known press-fit inserts and swaged inserts may be pressed into an opening in metal structures or parts after molding without the use of special tools or fasteners. However, known press-fit inserts and swaged inserts designed for press-fit installation in metal structures or parts may not work well with fiber reinforced thermoplastic composite structures or parts due to the non-ductile nature of the fiber reinforced thermoplastic composite material. Such non-ductile fiber reinforced thermoplastic composite material may lead to over-stressing of the material around the insert if the fit is too tight or may lead to poor retention of the insert if the fit is too loose, thus resulting in an improper fit. Thus, a proper fit of such known press-fit and swaged inserts may be difficult to attain with non-ductile materials such as fiber reinforced thermoplastic composite material. Moreover, post-molding methods for installing known press-fit inserts or swaged inserts may incur increased labor and manufacturing costs, increased set-up and operating time, and increased final part cost.

SUMMARY OF EXAMPLE EMBODIMENTS

An object of at least one embodiment of the present invention is to provide an assembly of mating subassemblies having dimensional control features for a motor vehicle in order to save costs by reducing the number of molding and processing steps to make the assembly.

In carrying out the above object and a few objects of at least one embodiment of the present invention, an assembly is provided. The assembly includes a composite molded first subassembly having a first set of molded-in dimensional control features. The assembly also includes an injection molded second subassembly having a second set of molded-in dimensional control features. The first and second sets of dimensional control features are integrally formed on their respective subassemblies to permit contact between the first and second sets of control features when the subassemblies are assembled together.

The first subassembly may include upper and lower halves wherein the first set of control features are integrally molded on the lower half of the first subassembly.

The vehicle may be a car wherein the first and second sets of molded-in dimensional control features act as cross-car and fore-aft dimensional control features.

The composite material of the first subassembly may comprise multiple plies of fiber-reinforced composite material.

The composite material may be carbon fiber reinforced plastic (CFRP).

The first subassembly may comprise multiple layers of fiber, prepreg sheets which are compression molded.

The first subassembly may be made of woven carbon fiber prepreg material.

The exterior surfaces of the first and second subassemblies may be class A, motor vehicle surfaces.

The assembly may be a spoiler assembly and the subassemblies may be wing and stanchion subassemblies.

BRIEF DESCRIPTION OF THE DRAWINGS

FIG. 16 is a view similar to the view of FIG. 12 but showing via arrows the locating features of one of the RH or LH stanchions and without mounting hardware;

FIG. 17 is a view similar to the view of FIG. 11 but showing via arrows the locating features on the outer surface of the lower wing half for one of the RH or LH stanchions;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
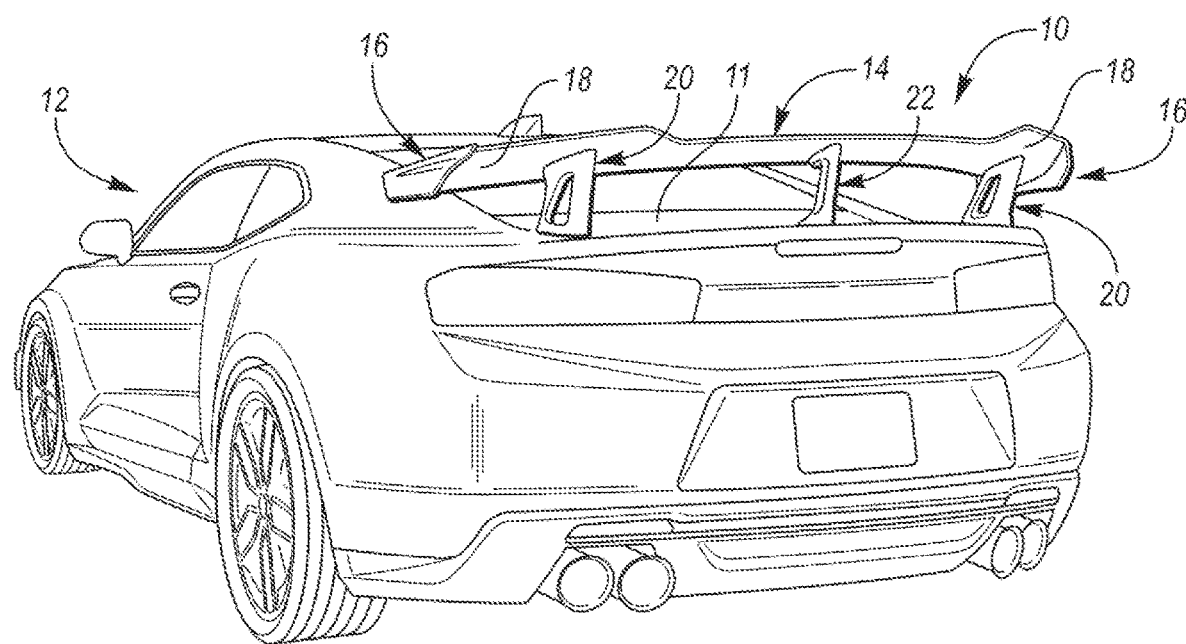
FIG. 1 is an environmental view of a spoiler assembly constructed in accordance with at least one embodiment of the invention and which is mounted on the rear end of an automotive vehicle.
Figure 2:
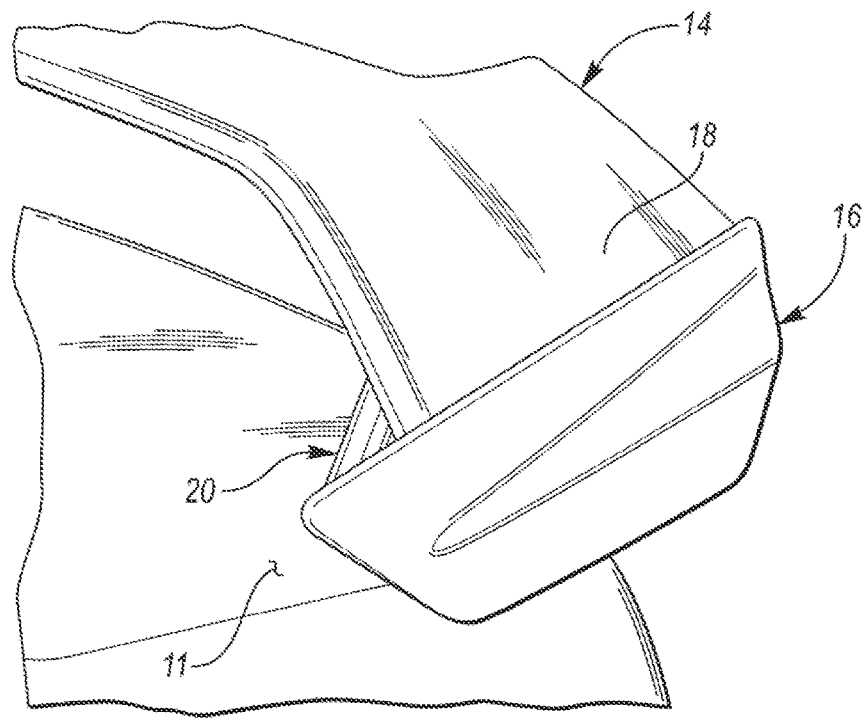
FIG. 2 is a view, partially broken away, of one end of the spoiler assembly of FIG. 1 shown mounted on the vehicle.
Figure 3:
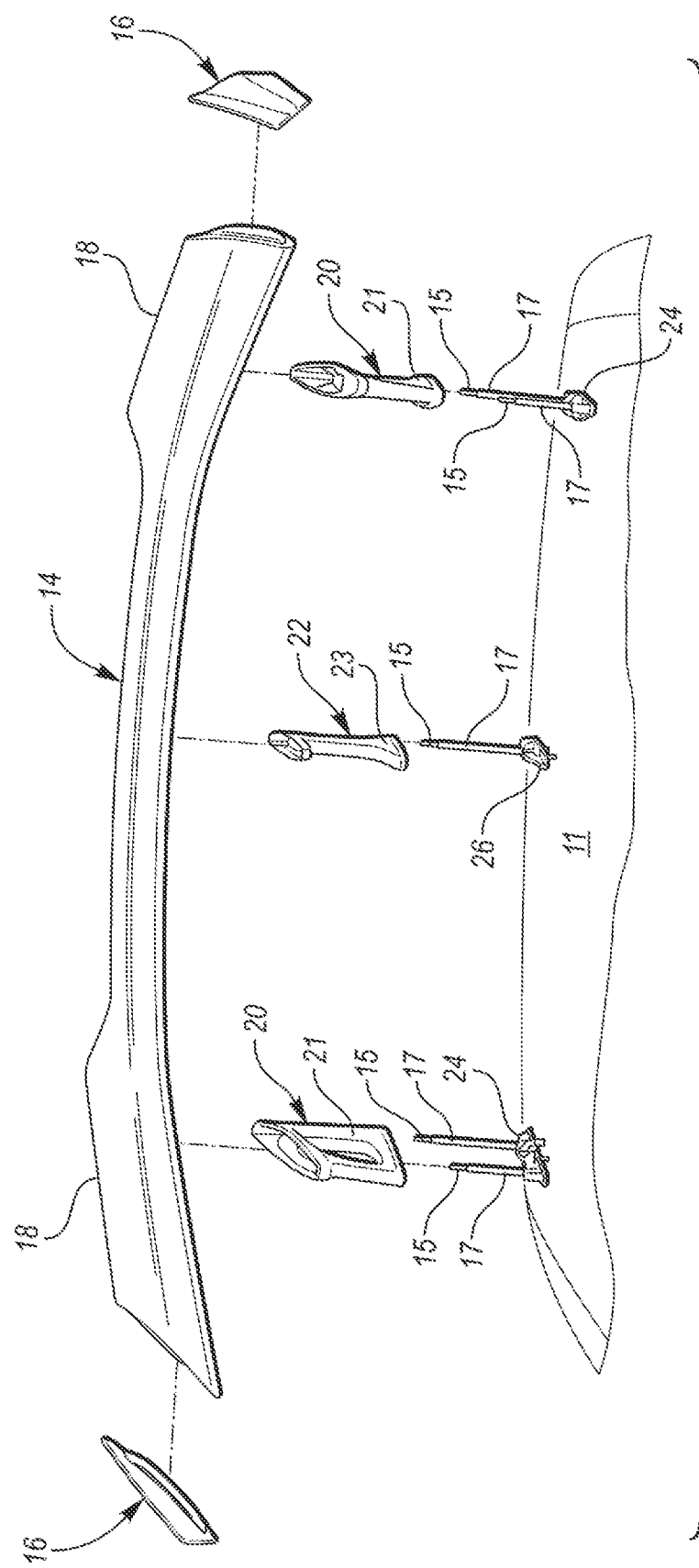
FIG. 3 is an exploded perspective view of the spoiler assembly of FIGS. 1 and 2 including mounting hardware constructed in accordance with at least one embodiment of the present invention.

Referring now to FIGS. 1, 2 and 3, here is illustrated a spoiler assembly, generally indicated at 10, mounted on the rear portion or panel 11 of an automotive vehicle 12. The spoiler assembly 10 includes a hollow wing subassembly, generally indicated at 14, and a pair of hollow end cap subassemblies, generally indicated at 16, which are adhesively bonded at opposite ends 18 of the wing subassembly 14. The end cap subassemblies 16 includes right hand (RH) and left hand (LH) subassemblies which are symmetrically opposite to each other.

The wing subassembly 14 is supported above the upper surface of the rear portion of the vehicle 12 by left and right hand hollow stanchion subassemblies or pedestals, generally indicated at 20, and a hollow center stanchion subassembly, generally indicated at 22. Each of the stanchion subassemblies 20 and 22 includes an injection molded outer member 21 and 23, respectively, for securing the assemblies 20 and 22 to the wing subassembly 14, and an injection molded inner member 24 and 26, respectively, for securing the stanchion subassemblies 20 and 22, respectively, to the vehicle 12.

The stanchion subassemblies 20 include RH and LH stanchion subassemblies which are symmetrically opposite to each other. Hardware is the form of nuts 13, elongated bolts 15, elongated bolt sleeves 17, and washers 19 are used to secure the stanchion subassemblies 20 and 22 to the wing subassembly 14 and the rear portion 11 of the vehicle 12. The sleeves function as load bearing spacers to allow load requirements for the stanchions to be met since the thin wall region(s) of the stanchions are not able to do so since they are relatively thin (about 1 mm). The injection molding process allows for an acceptable class A surface finish of the exterior surfaces of the stanchion.

Previous stanchions typically were solid injection molded parts or milled/cast steel/aluminum parts to meet loading requirements for the stanchions. A problem with solid injection molded parts is that such parts do not yield an acceptable surface finish due to the relatively large cross-sections of such parts.

By making the stanchions subassemblies 20 and 22 hollow, the stanchion subassemblies exhibit a class A surface finish, are light weight yet structurally rigid to meet loading requirements. By using standard, thin wall injection molding techniques together with the sleeves (i.e. load bearing spacers), the stanchion subassemblies 20 and 22 provide solutions to the problems with prior art stanchions.

The outer members 21 and 23 and the inner members 24 and 26 are preferably formed from PC-ABS which enables the stanchion subassemblies to be thin-wall injection molded. PC/ABS (Polycarbonate/Acrylonitrile Butadiene Styrene) is a blend of PC and ABS which provides a unique combination of the high processability of ABS with the excellent mechanical properties, impact and heat resistance of PC.

Figure 4A:
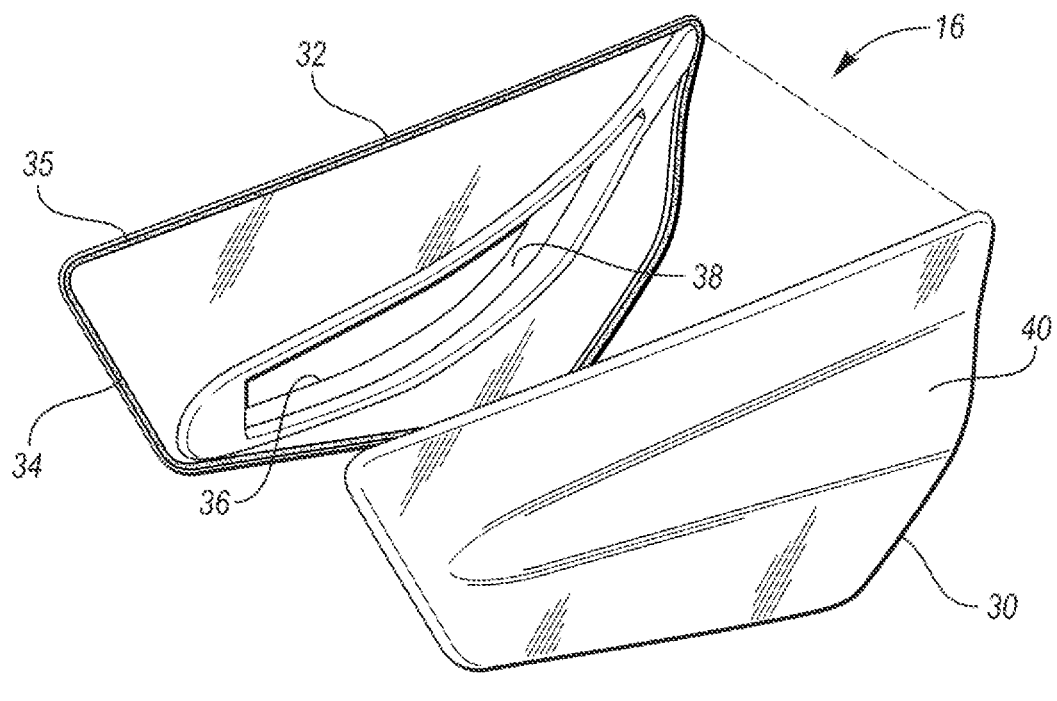
FIG. 4A is an exploded perspective view of inner and outer molded, curved panels or components which are adhesively bonded together to form an end cap subassembly for assembly at one end of a wing subassembly.
Figure 4B:
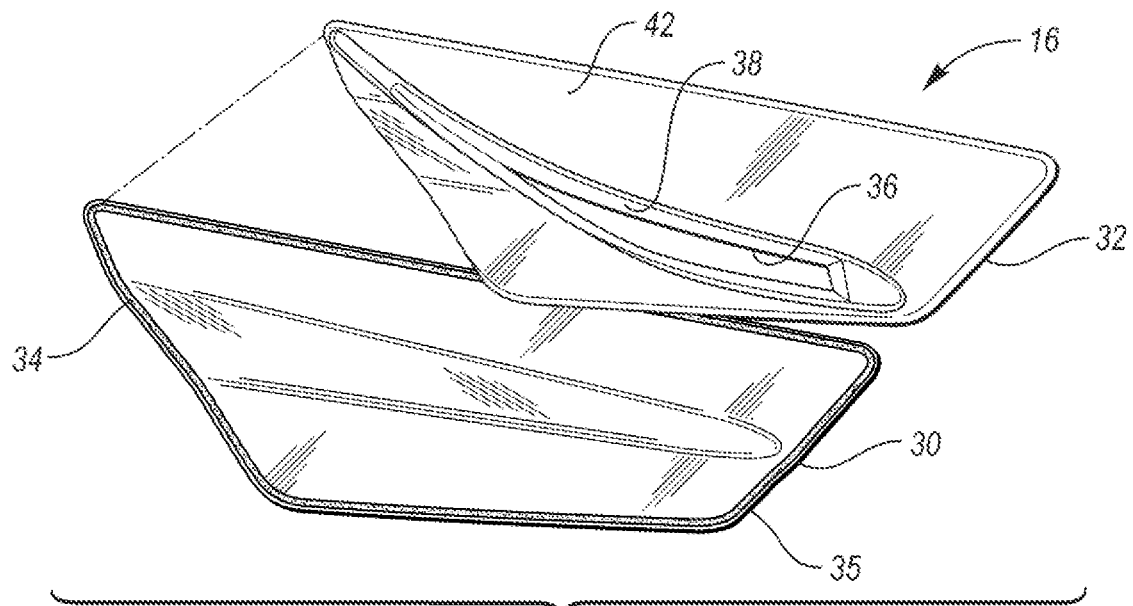
FIG. 4B is a view similar to the view of FIG. 4A but illustrating an end cap subassembly for assembly at the opposite end of the wing subassembly.

Referring now to FIGS. 4A and 4B, exploded views of the right hand and the left hand end cap subassemblies 16 are shown. Each subassembly 16 includes a composite molded outer component 30 and a mating composite molded inner component 32, which are bonded together by an adhesive 34 at their outer peripheries to form its respective subassembly 16. The adhesive 34 is positioned at an outer peripheral mating interface 35 between the components 30 and 32. Each of the inner components 32 includes an opening 36 and an integrally formed locating flange 38 which extends about the entire periphery of its respective opening 36. An exterior surface 40 of each of the outer components 30 is a class A, automotive vehicle surface. An exterior surface 42 of each of the inner components 32 is also a class A, automotive vehicle surface.

Each of inner and outer components 30 and 32 is preferably compression molded and is preferably formed by three plies or layers of fiber-reinforced composite material such as carbon-fiber reinforced plastic (CFRP). Each of the plies is preferably a woven mat of carbon fibers in an epoxy resin matrix. The two outer plies are 3K "veneer" plies and the middle ply is a 12K "structural" plie. The fibers are collected into thread-like bundles called "tows" which are wound onto large bobbins. Standard tow sizes are 1K, 3K, 6K, and 12K. The K designation means "thousands of filaments per tow." For example, a 3K fabric has 3,000 carbon fiber filaments per tow and a 6K fabric has 6,000 filaments per tow. The weaver loads the tows onto a loom where they are woven into a fabric. The most common forms of fabric are:

Woven (plain weave, twill, satin)
Unidirectional, Multidirectional (biaxial, triaxial, quasi-isotropic)
Nonwoven (chopped or continuous strand mats)

Figure 5:
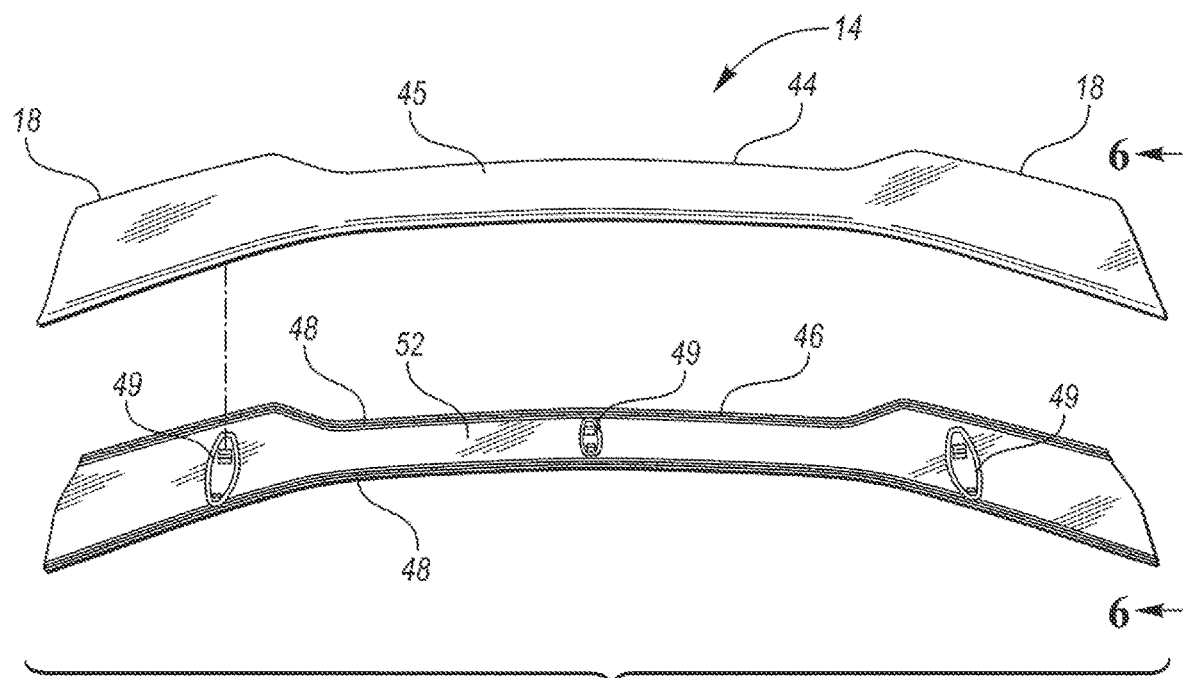
FIG. 5 is an exploded perspective view of upper and lower molded curved panels or components which are adhesively bonded together to form the wing subassembly for assembly with the right hand (RH) and left hand (LH) end cap subassemblies of FIGS. 4A and 4B.
Figure 6:
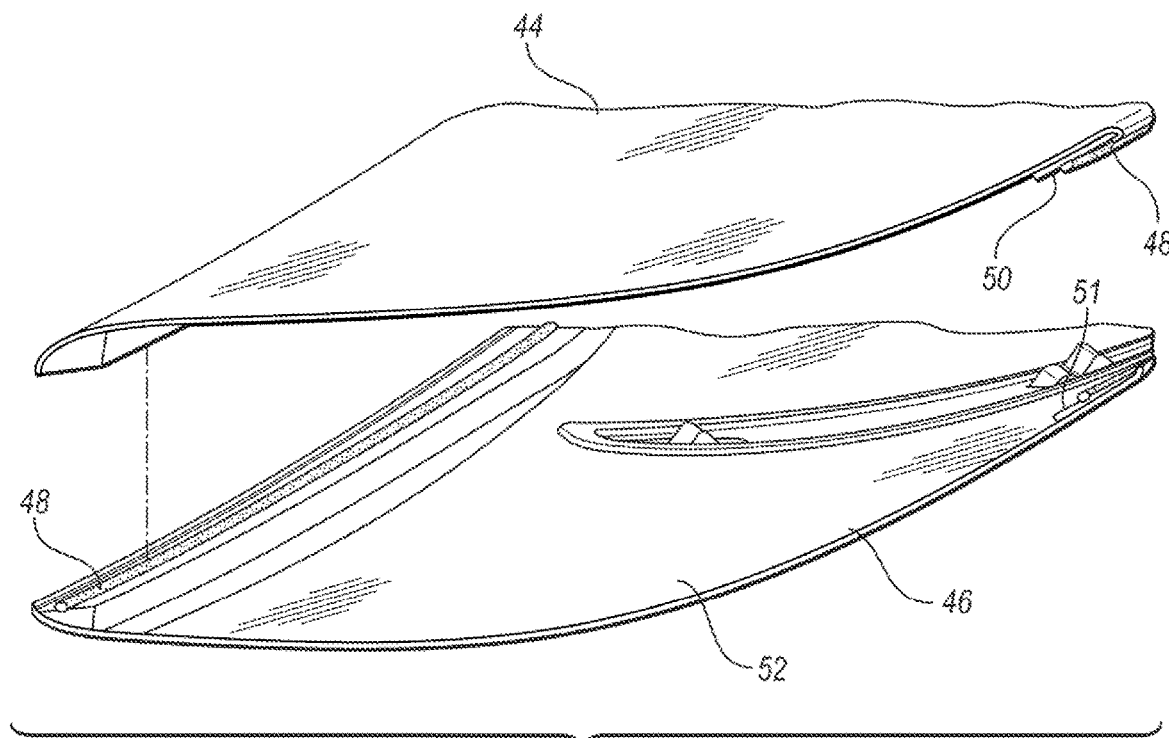
FIG. 6 is an exploded perspective view, partially broken away, taken along lines 6-6 of FIG. 5 of adhesive bond interfaces between the upper and lower wing components.

Referring now to FIGS. 5 and 6, there is illustrated an exploded view of mating upper and lower wing halves 44 and 46, respectively, of the wing subassembly 14. The wing halves 44 and 46 are bonded together at their outer perimeters (i.e. mating interface) by an adhesive 48. The inner surface of the upper wing half 44 includes a flange 50 which is received and retained within a trench or groove 51 formed in the inner surface 52 of the lower wing half 46 and bonded thereto by an adhesive at the mating surfaces of the wing halves 44 and 46. Exterior surfaces 45 and 47 of the wing halves 44 and 46, respectively, are class A surfaces. The exterior surface 47 of the lower wing half 46 has molded therein dimensional control features as described hereinbelow. The lower wing half 46 is compression molded to form raised and lowered features 49 at its inner surface 52 which features are complementarily formed at its outer surface 47 as described below.

As in the case of the end cap components 30 and 32, the wing halves 44 and 46 are compression molded and are preferably formed by three plies or layers of fiber-reinforced, composite material such as CFRP (i.e. 2 outer veneer plies and a 12K inner structural ply).

Figure 7:
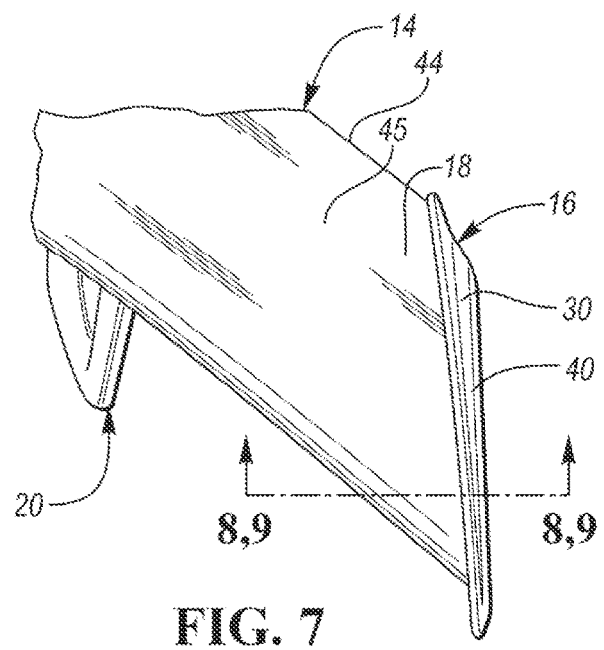
FIG. 7 is a perspective view, partially broken away, of one end of the spoiler assembly.
Figure 8:
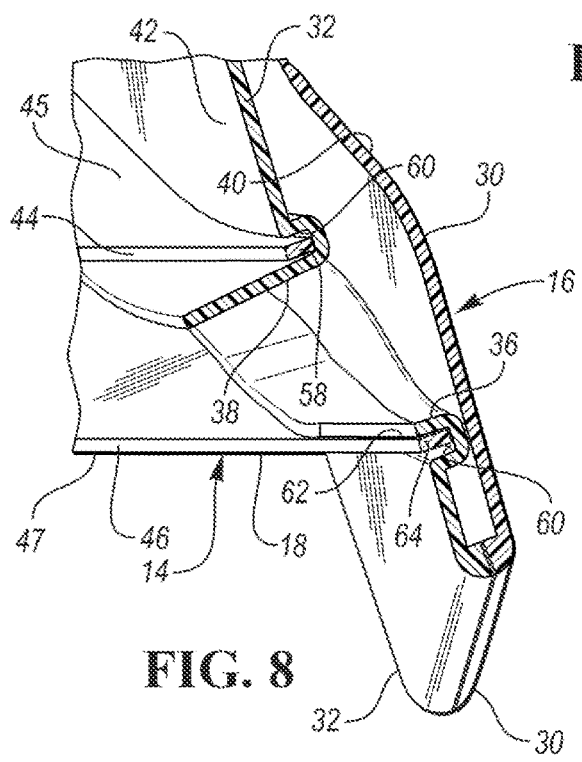
FIG. 8 is a view, partially broken away and in cross section, taken along lines 8-8 of FIG. 7 and showing a nominal bond position of a mating interface between the wing subassembly and the end cap subassembly.
Figure 9:
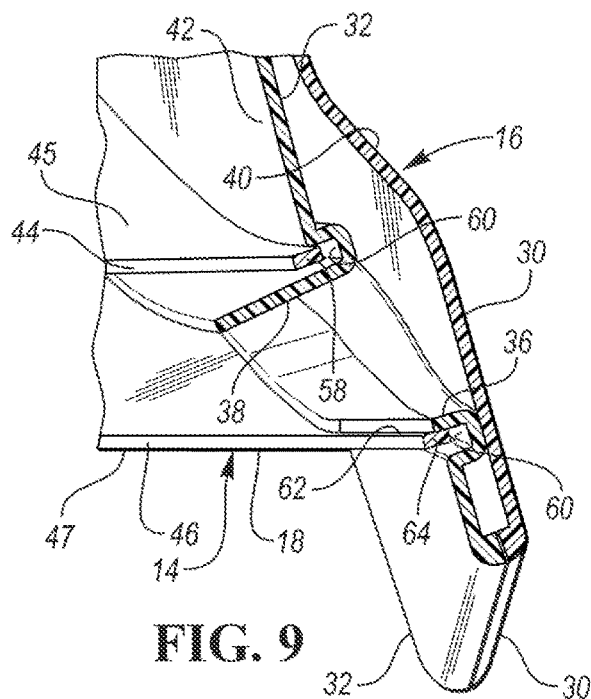
FIG. 9 is a view similar to the view of FIG. 8 taken along lines 9-9 of FIG. 7 but showing a bond position which is offset (i.e. about 5 mm) from the nominal bond position of FIG. 8.

Referring now to FIGS. 7-9, there is illustrated in FIG. 7 the wing subassembly 14 and one of the end cap subassemblies 16 bonded at one end 18 of the subassembly 14 and which is supported by one of the stanchion subassemblies 20. FIG. 8 shows an adjustable bond or mating interface between the composite materials which make up the one end 18 of the wing subassembly 14 and the inner component 32 of the subassembly 16. Part of the interface includes a curved flange 58 disposed on and integrally formed at the end 18 of the upper wing half 44 and also includes a trench or groove 60 integrally formed about the opening 36 of the inner component 32. The interface also includes the flange 38 which at least partially defines the groove 60 and which extends into an opening 62 formed between and by the wing halves 44 and 46.

Still referring to FIG. 8, part of the adjustable bond or mating interface includes a flange 64 disposed on and integrally formed at the end 18 of the lower wing half 46 and also includes the trench or groove 60. The interface provides for a nominal bonding position between the subassembly 14 and the subassembly 16 as shown in FIG. 8 and an offset bonding position as shown in FIG. 9. The bonding position of FIG. 8 may be offset by, for example, 5 mm in FIG. 9 from the nominal bonding position shown in FIG. 8.

The adjustability of the mating interface allows one to adjust the bonding process during the assembly of the subassembly 14 to the subassembly 16 via an adhesive (not shown) or other bonding mechanism. Previous bonding processes required a very tight molding tolerance and thus needed more complex tooling and post-molding operations for surface preparations for such composite materials. The adjustable mating interface of at least one embodiment of the present invention allows a bonding position of the flange 58 and the flange 64 within the groove 60 to be adjusted during assembly of the subassembly 14 with the subassembly 16. In this way, the mating interface is adjustable. This allows for a larger window for dimensional adjustability and the ability to fine tune the appearance of the complete assembly 10. Also, the mating interfaces of the prior art are visible bond interfaces that are aesthetically unappealing. Interfaces of at least one embodiment of the invention save cost of tooling/labor and cost/timing to complete dimensional validation processes which are often required. The interfaces of at least one embodiment of the invention also allows for reduction in fiber stress and better control of the fiber weave during the layup process hereby allowing for a better appearance for the complete assembly 10.

Figure 10:
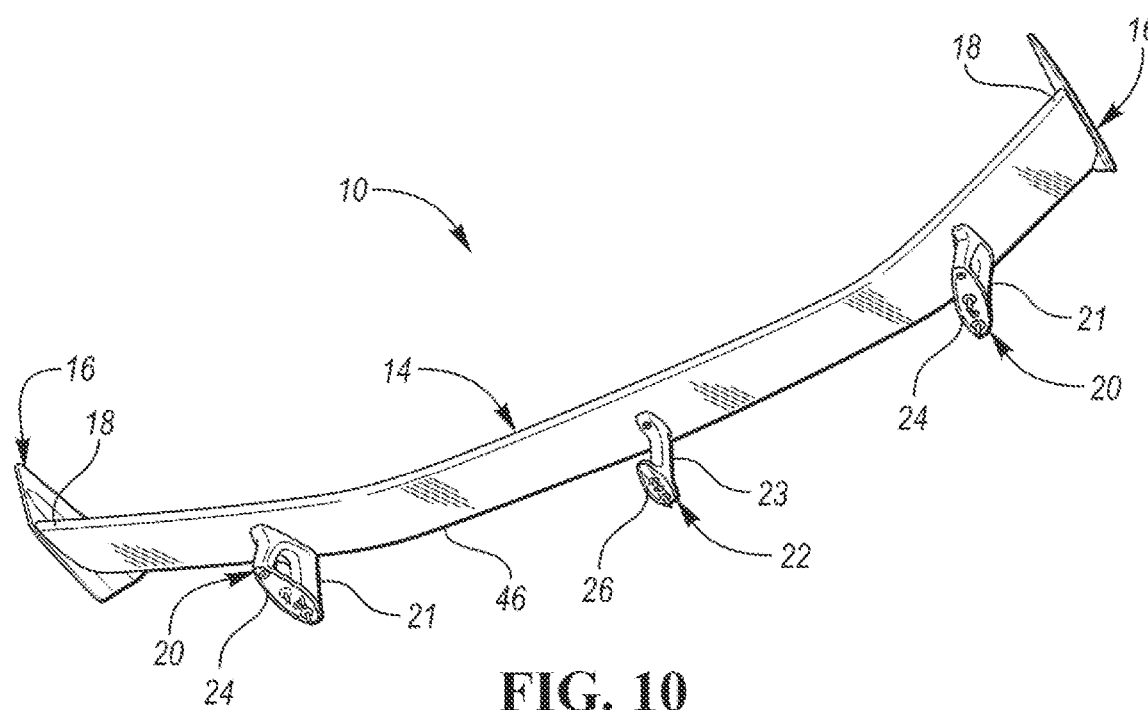
FIG. 10 is a bottom perspective view of the spoiler assembly of FIG. 3 after bonding and assembly and further illustrating center and LH/RH stanchion subassemblies and mounting hardware.
Figure 11:
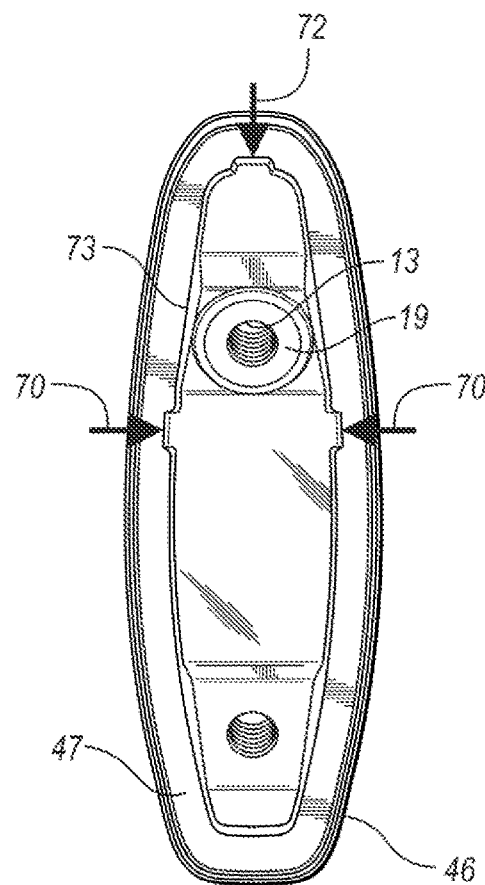
FIG. 11 is an enlarged bottom view, partially broken away, of an outer mating surface of the lower wing half wherein dimensional control features which act as cross-car (c/c) and fore-aft (F/A) locating features are illustrated at arrows.
Figure 12:
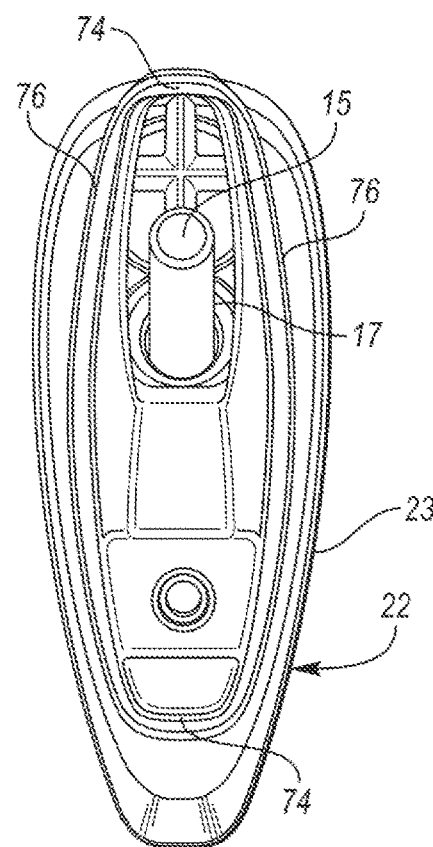
FIG. 12 is a top perspective view of a mating surface of the center stanchion and illustrating locating features on the center stanchion which correspond to the locating features on the lower wing half.
Figure 14:
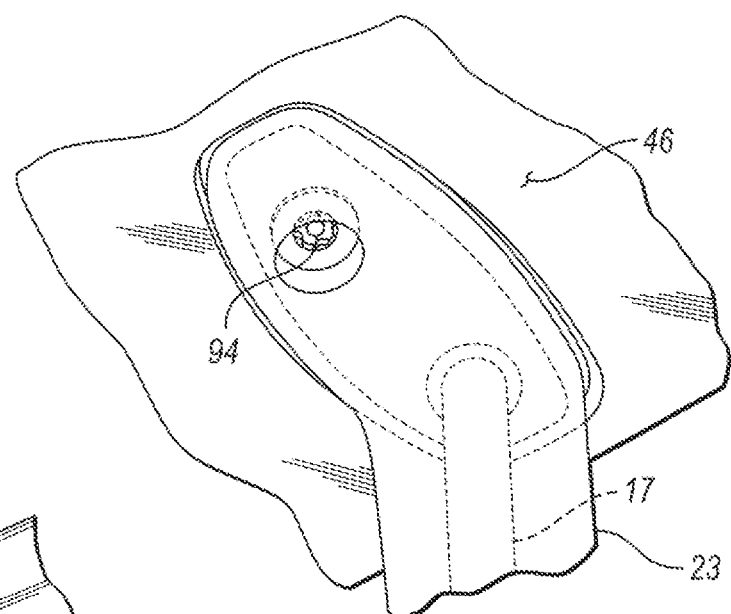
FIG. 14 is an enlarged, bottom perspective view, partially broken away, of the center stanchion mounted to the lower wing half and with inner structural features indicated by phantom lines.

Referring now to FIG. 10, there is illustrated a bottom, schematic view of the assembly 10 which is constructed and assembled in accordance with an embodiment of the invention. FIGS. 11-15 particularly illustrate molded-in, dimensional control features in the form of side notches 70 and a top notch 72 compression molded in an inner peripheral rim 73 at the outer surface 47 of the lower wing half 46. The side notches 70 are cross-car (C/C) locating features for the mating subassemblies of the assembly 10 and the top notch 72 acts as a fore-Aft (F/A) locating feature for the mating subassemblies. One of the mating subassemblies is the wing subassembly 14 which includes at its lower wing half 46, the side notches 70 and the top notch 72 (and a bottom notch (not shown)) and the other of the mating subassemblies is the stanchion subassembly 22 which includes the outer member 23 of the center stanchion subassembly 22. The outer member 23 includes molded-in side flanges 76 or tabs which are fit within and contact the walls of the side notches 70. The top and bottom flanges 74 are fit within and contact the walls of the top and bottom notches 72. The notches 70 and 72 formed in the rim 73 are incorporated in the composite molding process to increase dimensional consistency of the overall assembly 10. The notches 70 and 72 act as part of a dimensional datum control plan.

Previously, dimensional features required post-molding operations which increased cost/labor/time. Molded-in notches 70 and 72 provide a more robust dimensional stack-up due to the reduced molding and processing steps thereby improving dimensional repeatability. Also, the molded-in locating features minimize variability in the final assembled position of the stanchion subassembly 22 relative to the wing subassembly 14. The dimensional control features molded in the lower wing half 46 thereby assist dimensional consistency and repeatability during the assembly process.

Referring now to FIGS. 10-15 and FIGS. 21-23, as previously mentioned, the stanchion subassembly 22 also includes hardware to attach or fasten the subassembly 22 to the lower wing half 46 and the subassembly 22 to the back portion or panel 11 of the vehicle 10. The hardware also provides load bearing spacers. The hardware includes the nut 13, the elongated, threaded bolt 15, the elongated bolt sleeve 17 and the washer 19. The washer 19 and the nut 13 are insert molded within the lower wing half 46. The bolt 15 is received and retained within the bolt sleeve 17 which, in turn, is mounted within an aperture 88 which is formed in the inner member 26. The bolt 15 extends from the aperture 88, through the washer 19 and is threadedly received and retained within the internally threaded nut 13 which is held within a hollow, apertured cage 90 which is integrally molded at the lower surface 47 of the wing half 46. A bolt 94 threadedly secures the outer member 23 to the lower wing half 46.

The outer walls which form the cage 90 has two structural plies 80 and 82 (i.e. a "sandwich" layup (12K, 12K)) at the lower wing half 46.

Optionally, the hardware includes a post-molded support 92 and a rivet 95 which extends from the outer member 23 into the lower wing half 46 and helps holds the support 92 against the lower surface 47 of the lower wing half 46 to help secure the stanchion subassembly 22 to the lower wing half 46. The ability to insert mold the nut 13 and the washer 19 into the lower wing half 46 without the need for post-mold operations (ie. post-mold bonding via adhesives or other means) allows extremely accurate and repeatable fastening of the stanchion subassembly 22 to the lower wing half 46. In this way, dimensional inconsistencies are reduced by the composite molding process. Furthermore, time/cost/labor is reduced and the possibility of damaging late in the process cycle is reduced.

Figure 13:
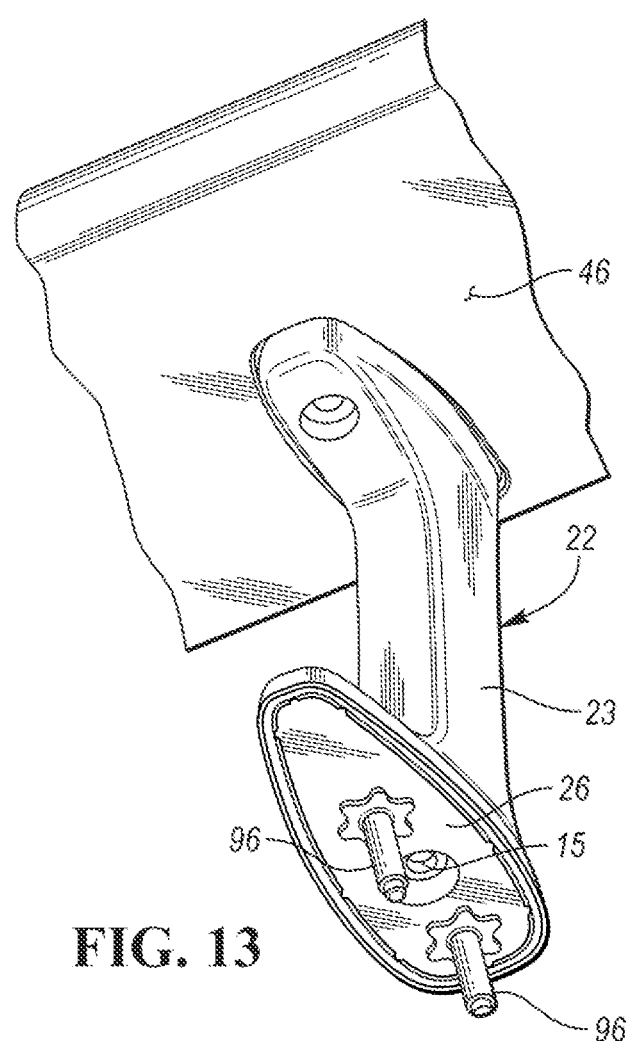
FIG. 13 is a bottom perspective view, particularly broken away, of the spoiler assembly including the center stanchion mounted on the outer surface of the lower wing half or component and ready to be mounted on the vehicle of FIG. 1.
Figure 15:
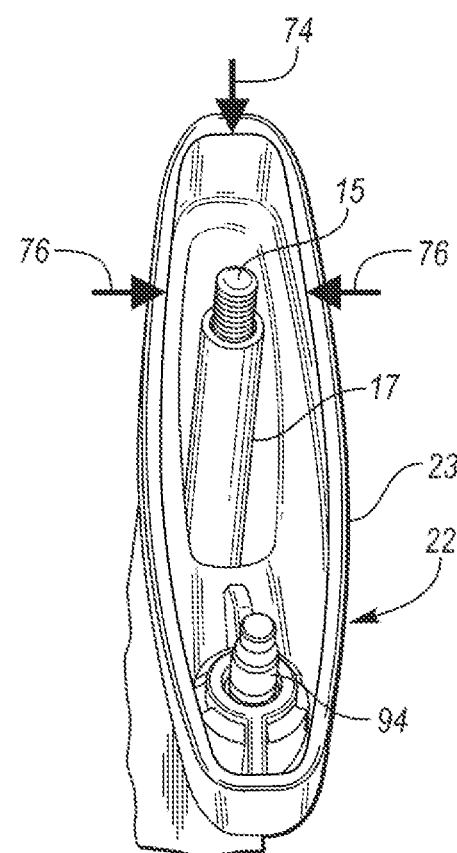
FIG. 15 is a top perspective view, partially broken away, of the top of the center stanchion which interfaces with the lower surface of the lower wing half wherein arrows indicate locating features.
Figure 19:
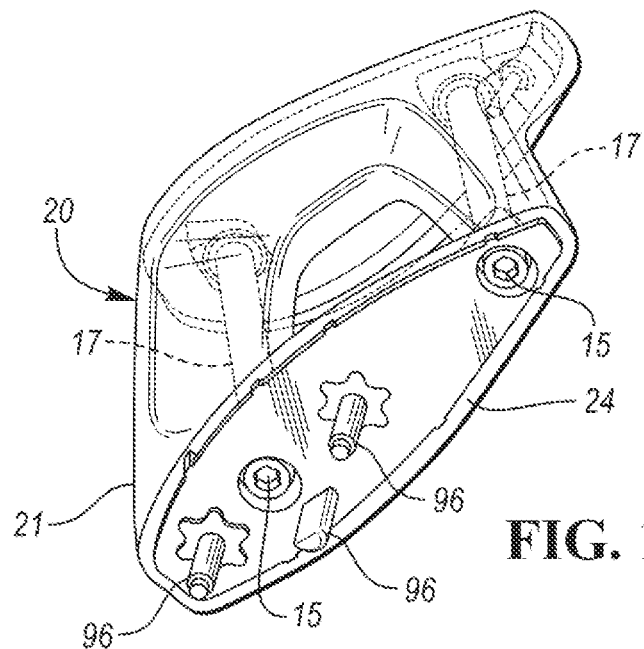
FIG. 19 is an enlarged view, partially broken away, which shows via phantom lines how the stanchion of FIG. 18 is mounted to the lower wing half.
Figure 18:
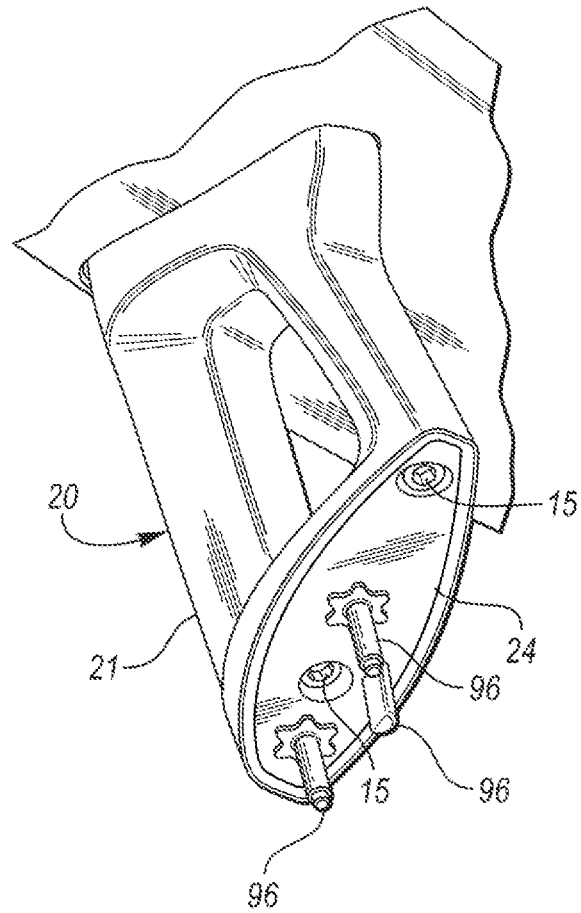
FIG. 18 is a view similar to the view of FIG. 13 but for one of the RH or LH stanchions.
Figure 20:
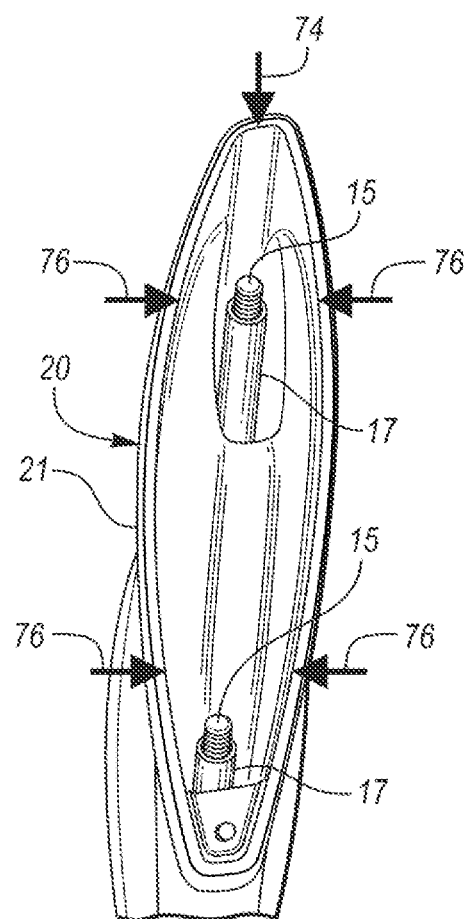
FIG. 20 is a view similar to the view of FIG. 15 and illustrating via arrows the dimensional control features formed at the top of one of the RH or LH stanchions.
Figure 21:
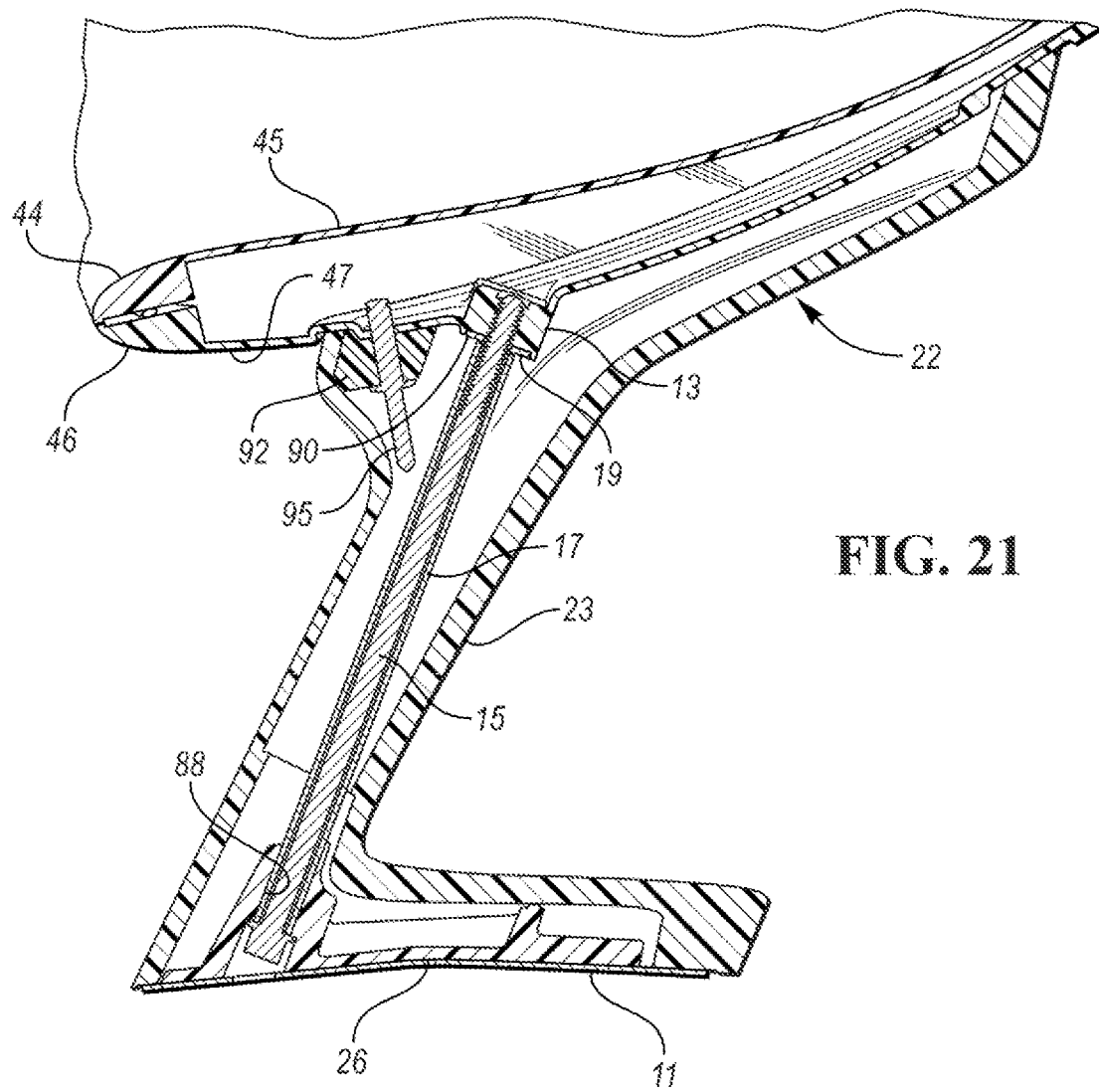
FIG. 21 is a side view, partially broken away and in cross-section, of the center, hollow, injection molded stanchion including mounting hardware attached to the lower wing half and a back panel of the vehicle.
Figure 22:
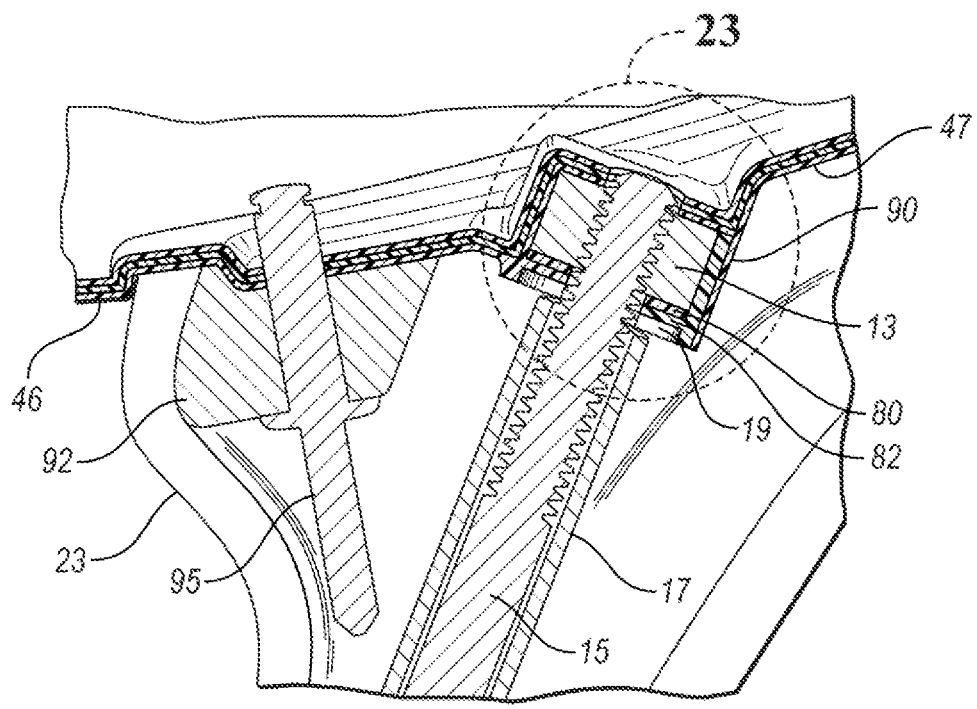
FIG. 22 is an enlarged view, partially broken away and in cross-section, showing in detail a bolt, a nut, a bolt sleeve or spacer and a washer for securing the stanchion to the lower wing half including an optional post-molded support and pin to provide further support.
Figure 23:
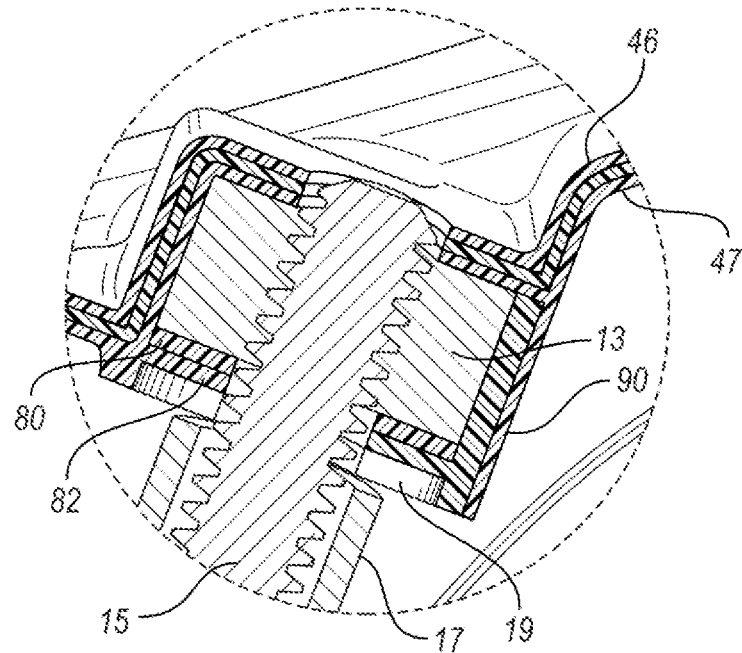
FIG. 23 is an enlarged view, taken within the phantom circle shown in FIG. 22, illustrating the various layers of fiber, pre-preg sheets which are compression molded to form the lower wing half and its nut and washer holder or cage and further illustrating the multiple veneer and structural plies of fabric material.
Figure 24:
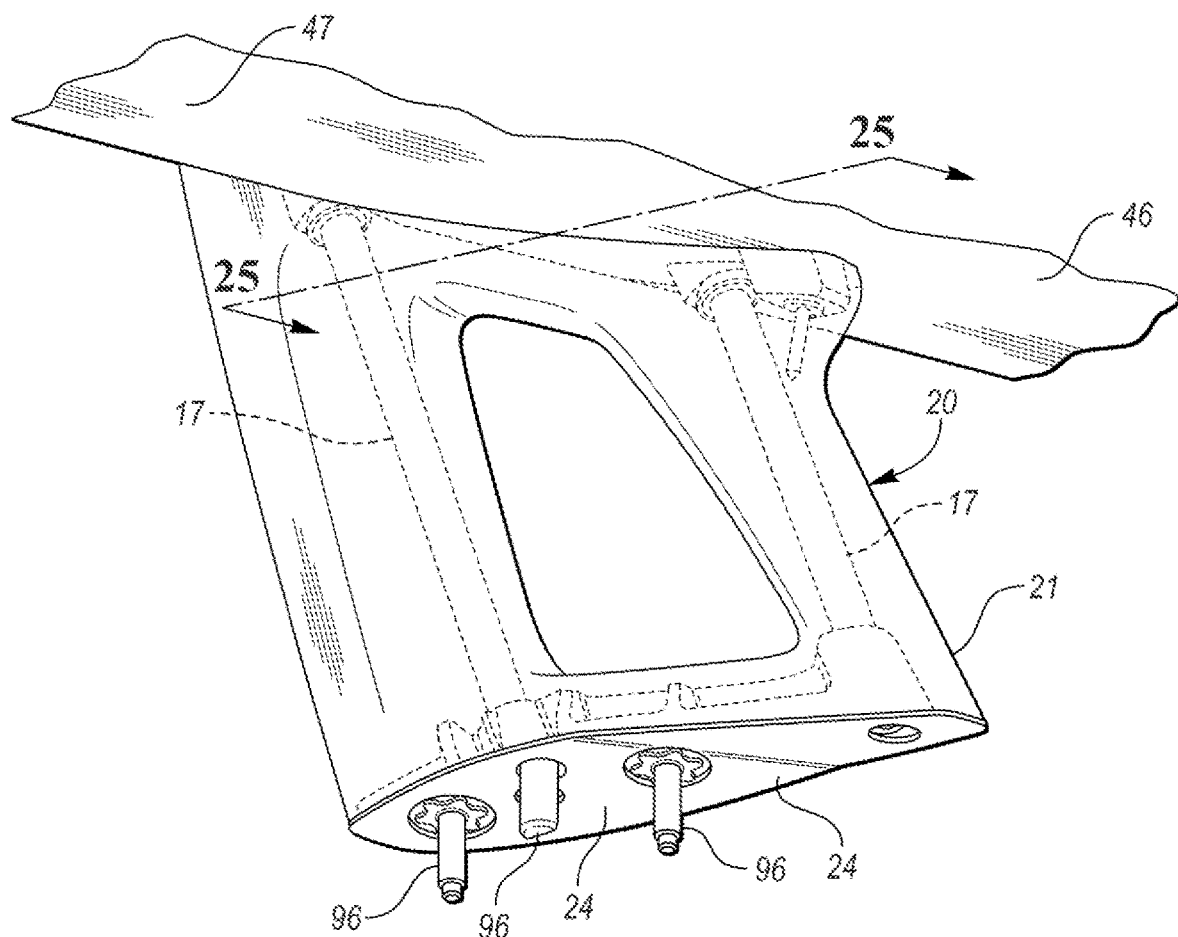
FIG. 24 is an enlarged bottom perspective view, partially broken away, which shows various fastening features (including some via phantom lines) included in the molding and assembly processes to secure one of the RH or LH stanchions to the lower wing half.
Figure 25:
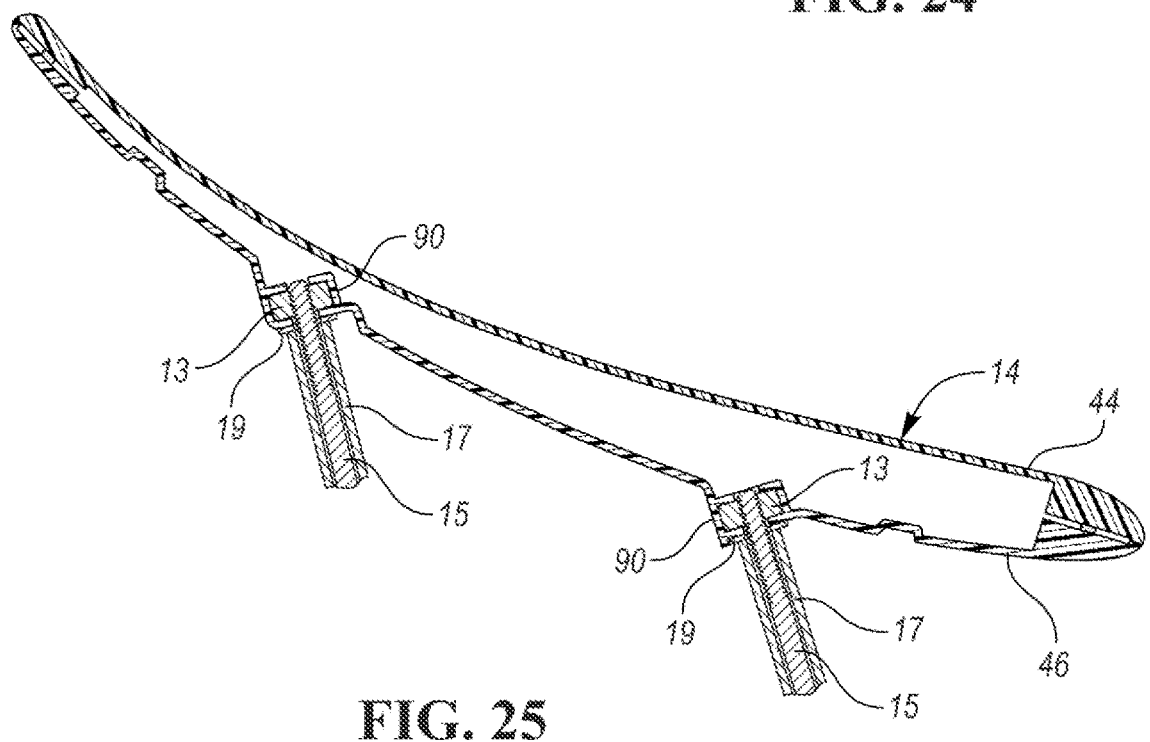
FIG. 25 is a view similar to the view of FIG. 24 taken along lines 25-25 in FIG. 24 but showing the wing subassembly and mounting hardware in section to show the insert molded nut and washer holders or cages in relation to the mounting hardware.
Figure 26:
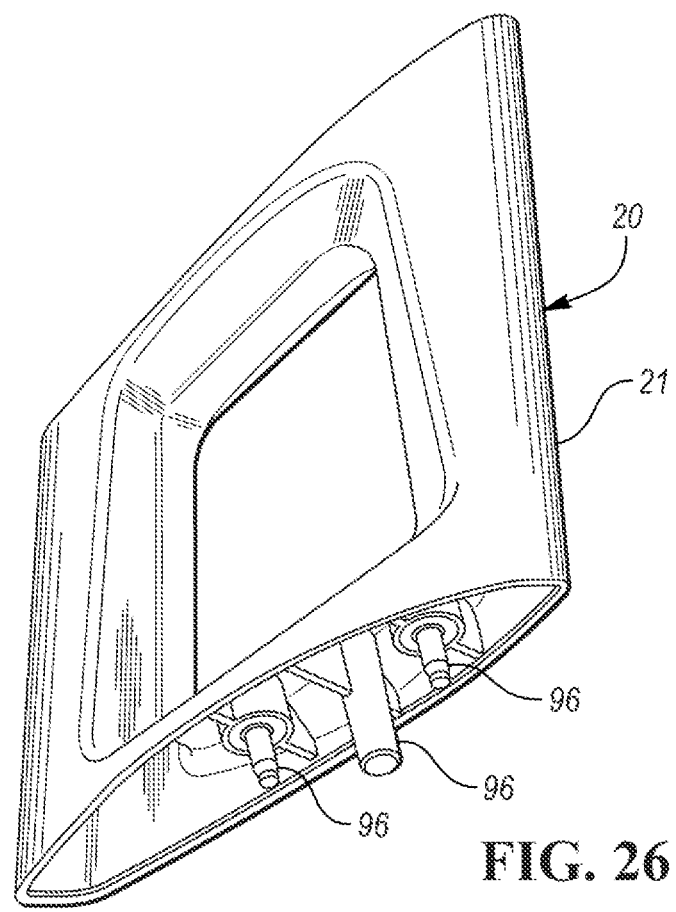
FIG. 26 is a bottom perspective view of one of the RH or LH stanchions and particularly showing the fasteners for fastening the stanchion to the vehicle.
Figure 27:
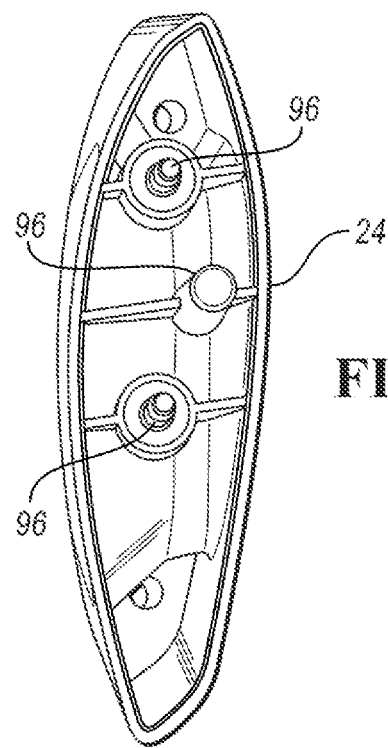
FIG. 27 is a view similar to the view of FIG. 26 but further illustrating the mounting fasteners.
Figure 28:
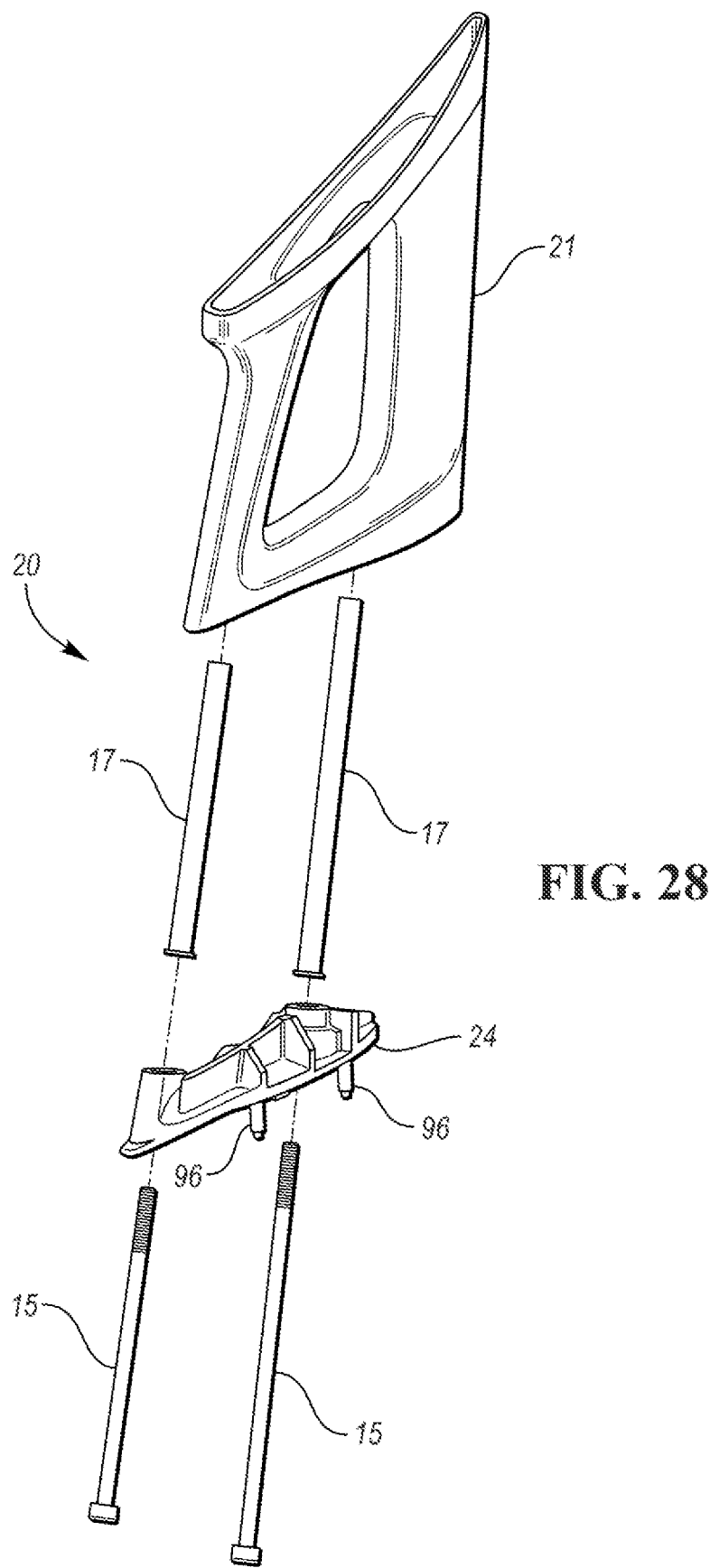
FIG. 28 is a side, exploded perspective view of one of the LH or RH injection molded stanchions together with its injection molded mounting base and mounting hardware.
Figure 29:
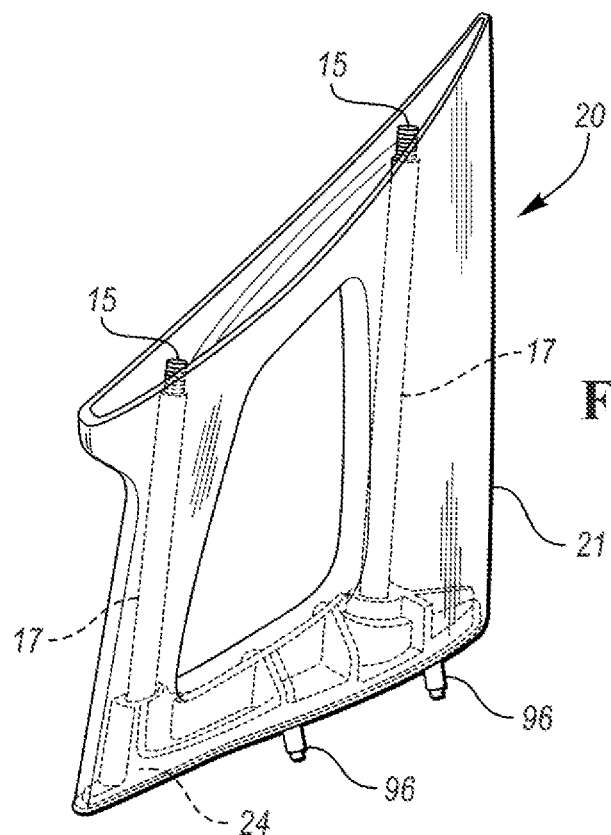
FIG. 29 is a top perspective view of the stanchion subassembly of FIG. 28 but with the mounting base and hardware assembled in the stanchion outer member via phantom lines.
Figure 30:
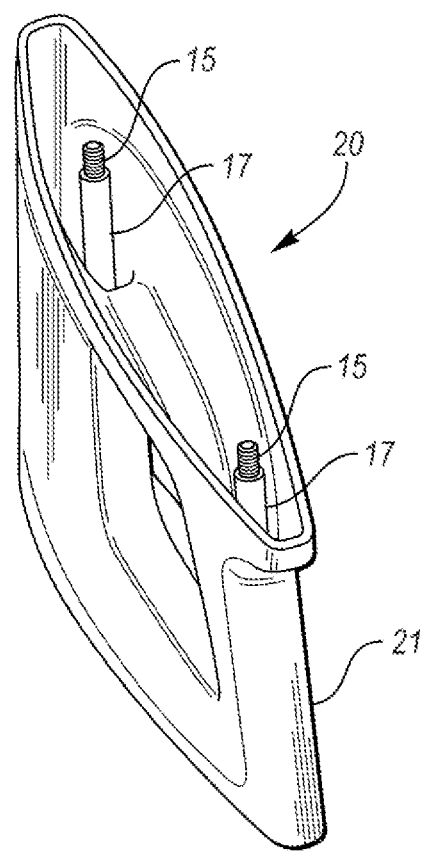
FIG. 30 is another top perspective view of the stanchion subassembly of FIGS. 28 and 29 assembled with its mounting hardware.

Still referring to FIG. 13, there is illustrated a pair of fasteners 96 which may be insert or otherwise molded with the inner member 26. The fasteners 96 are typically used to fasten the inner member 26 and, consequently, the stanchion subassembly 22 to the vehicle 12 at the body panel 11.

Referring now to FIGS. 16-20 and 24-30, there is illustrated a pair of left and right hollow stanchion subassemblies 20 and their mounting/fastening hardware. Parts/components of the stanchion subassemblies 20 which are the same or similar in either structure or function to the center stanchion subassembly 22 have the same reference number.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A spoiler assembly for a motor vehicle, the assembly comprising:
    a composite molded wing subassembly, the wing subassembly being of a composite material and having a panel including an interior surface and an exterior surface, the wing subassembly having a set of molded-in dimensional locating features at the exterior surface of the panel, wherein the molded-in dimensional locating features are notches compression molded in an inner peripheral rim at the exterior surface of the panel;
    an injection molded stanchion subassembly for supporting the wing subassembly thereon, the stanchion subassembly having a member including a set of molded-in dimensional positioning features; and
    wherein the molded-in dimensional positioning features of the stanchion subassembly contact the molded-in dimensional locating features of the wing subassembly to establish a position of the member of the stanchion subassembly to the panel of the wing subassembly when the stanchion subassembly is assembled to the panel of the wing subassembly.

2. The assembly as claimed in claim 1, wherein the panel of the wing subassembly is a lower wing half of the wing subassembly and the wing subassembly further includes an upper wing half.

3. The assembly as claimed in claim 1, wherein the molded-in dimensional locating features and the molded-in dimensional positioning features act as cross-car and fore-aft dimensional control features.

4. The assembly as claimed in claim 2, wherein the composite material of the lower wing half of the wing subassembly comprises multiple plies of fiber-reinforced composite material.

5. The assembly as claimed in claim 4, wherein the composite material is carbon fiber reinforced plastic (CFRP).

6. The assembly as claimed in claim 2, wherein the lower wing half of the wing subassembly comprises multiple layers of fiber, prepreg sheets.

7. The assembly as claimed in claim 6, wherein the lower wing half of the wing subassembly is made of woven carbon fiber prepreg material.

8. The assembly as claimed in claim 1, wherein the exterior surface of the wing subassembly and an exterior surface of the stanchion subassembly are class A, motor vehicle surfaces.

* * * * *